United States Patent [19]
Freeman

[11] Patent Number: 5,930,757
[45] Date of Patent: Jul. 27, 1999

[54] INTERACTIVE TWO-WAY CONVERSATIONAL APPARATUS WITH VOICE RECOGNITION

[76] Inventor: Michael J. Freeman, 1270 Avenue of the Americas, Suite 2401, New York, N.Y. 10020

[21] Appl. No.: 08/749,345

[22] Filed: Nov. 21, 1996

[51] Int. Cl.[6] .................................................. G10L 3/02
[52] U.S. Cl. ......................... 704/272; 446/175; 704/231; 704/246
[58] Field of Search .................................... 704/272, 275

[56] References Cited

U.S. PATENT DOCUMENTS

| | | |
|---|---|---|
| 3,735,503 | 5/1973 | Dow et al. . |
| 3,947,972 | 4/1976 | Freeman . |
| 4,078,316 | 3/1978 | Freeman . |
| 4,117,605 | 10/1978 | Kurland et al. . |
| 4,170,832 | 10/1979 | Zimmerman . |
| 4,221,927 | 9/1980 | Dankman et al. ........................... 179/1 |
| 4,264,924 | 4/1981 | Freeman . |
| 4,264,925 | 4/1981 | Freeman et al. . |
| 4,318,245 | 3/1982 | Stowell et al. ............................. 46/232 |
| 4,420,656 | 12/1983 | Freeman . |
| 4,445,187 | 4/1984 | Best . |
| 4,571,640 | 2/1986 | Baer . |
| 4,573,072 | 2/1986 | Freeman . |
| 4,591,248 | 5/1986 | Freeman . |
| 4,753,597 | 6/1988 | Pash et al. . |
| 4,766,529 | 8/1988 | Nakano et al. ...................... 364/513.5 |
| 4,799,171 | 1/1989 | Cummings ........................... 364/513.5 |
| 4,847,699 | 7/1989 | Freeman . |
| 4,896,357 | 1/1990 | Hatano et al. ............................. 381/43 |
| 5,213,510 | 5/1993 | Freeman . |
| 5,281,143 | 1/1994 | Arad et al. ............................... 434/185 |
| 5,324,225 | 6/1994 | Satoh et al. .............................. 446/175 |
| 5,340,317 | 8/1994 | Freeman . |
| 5,377,303 | 12/1994 | Firman ................................... 704/275 |

OTHER PUBLICATIONS

Usami, Shozo, "Parallel Random Access System: A New Method to Improve Foreign Language Training", Educational Technology, Feb. 1979, pp. 33–35.

*Primary Examiner*—David R. Hudspeth
*Assistant Examiner*—M. David Sofocleous
*Attorney, Agent, or Firm*—David M. Klein; Shearman & Sterling

[57] ABSTRACT

A voice recognition interactive conversational apparatus employs temporally related data storage tracks containing interactive conversational content. The conversational content is stored on each track in information segments. Each of the segments forms a complete message reproducible in response to the selection of the track upon which the segments are stored. Each information segment includes interrogatories having vocal responses, responsive messages, informational messages, or combinations thereof related in time and content to information contained on at least one other track. The information is stored on the tracks in a predetermined timed sequence for providing interactive conversation dependent on the verbal responses. A playback device facilitates playback of the conversational content. A track selector randomly accesses the tracks for retrieving and play back the information stored thereon via the playback device. A voice recognition controller receives vocal responses to the conversational content and causes the track selector to switch between the data storage tracks based upon the vocal responses in accordance with the interactive conversational content.

19 Claims, 3 Drawing Sheets

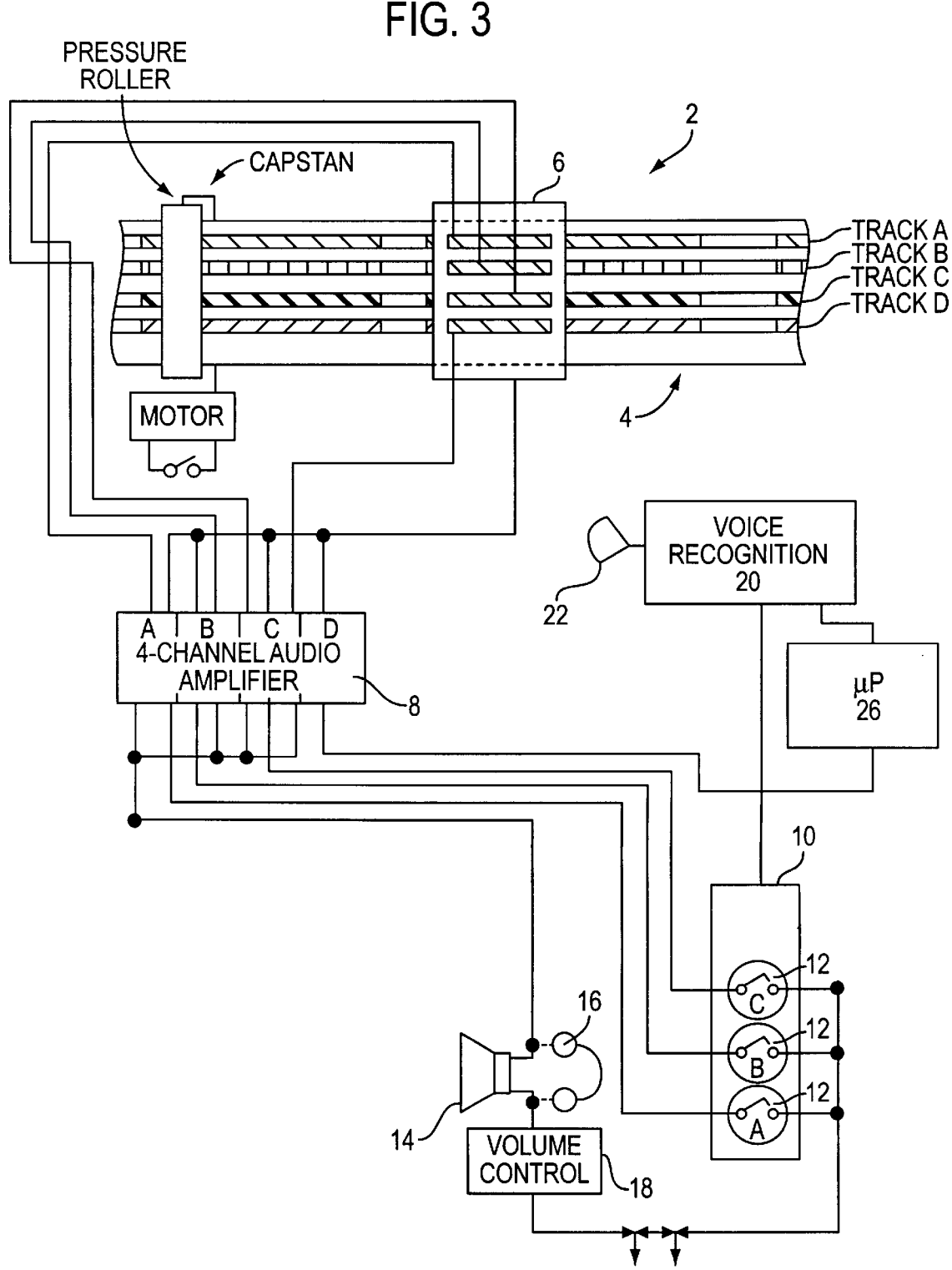

INTERACTIVE TWO-WAY CONVERSATIONAL APPARATUS WITH VOICE RECOGNITION

BACKGROUND OF THE INVENTION

1. Field of the Invention

The present invention relates generally to interactive systems, and more particularly to an interactive conversational apparatus which utilizes pre-recorded multi-track media to store interactive conversational content and which employs voice recognition to enable verbal communication between the user and the apparatus to provide more realistic conversational content and to facilitate use of the apparatus as an educational tool or for verbal training.

2. Description of the Prior Art

Systems that perform interactive conversation are well known in the art. These systems have used a variety of different techniques to achieve interactive conversation, although none has been successful in providing full two-way intelligent sounding verbal dialog between the device and the user or in providing verbal training to children or others in need of such training.

For example, commonly owned U.S. Pat. Nos. 3,947,972 and 4,078,316, the contents of each of which are incorporated herein by reference, disclose a conversational teaching apparatus which employs a time synchronized multi-track audio tape to store educational conversation messages. This device employs one track to relay interrogatories to a user. The tracks are then used, selectable by a manual switching mechanism, to convey responsive messages.

Commonly owned U.S. Pat. Nos. 5,313,510 and 5,340,317, the contents of each of which are incorporated herein by reference, improved upon the earlier conversational system by programming conversations on a magnetic media in a decision-tree logic which allowed complex conversations to be developed using the multi-track media. The information is stored on each track in a plurality of reproducible information segments which contain interrogatory messages and associated multiple choice responses, responsive messages, informational messages, and combinations thereof. The responsive messages contained on the tracks are related in real-time and content to particular interrogatory messages on the tracks, and correspond with multiple choice selectable responses. The apparatus could exhibit pseudo-memory and multiple simultaneous pseudo-memories; exhibit profiling and substitutability; and categorize and subcategorize users of the apparatus.

Other multiple choice child response systems are exemplified by the systems disclosed in U.S. Pat. Nos. 2,921,385; 3,020,360; 2,826,828; 3,623,238; 3,546,791; 3,273,260; 3,665,615; 3,245,157; 3,284,923; 3,538,621; 3,477,144; 3,708,891; 3,255,536; 2,777,901; 2,908,767; 3,774,316; 3,194,895; 3,484,950; 3,343,280; and 3,763,577, by way of example.

One weakness of existing systems, especially for children, is that they cannot teach how to talk to the device so that the device can recognize the speech. Also, none of these prior systems utilizes voice recognition in an interactive conversational apparatus so that the apparatus could receive and respond to voice responses to interrogatory messages, informational messages, and combinations thereof generated by the apparatus. Utilization of a voice responsive interface would permit such an apparatus to retain the long-term motivational, entertainment, and educational interests of a child, and would enable the apparatus to be used to teach a child to speak, in general, to speak in such a way as to allow the device to understand human speech at a higher rate of reliability, or to verbally respond to interrogatories or commands. Such an apparatus could also be used to teach adults or children to properly interact with voice responsive systems, greatly increasing the system's user friendliness and usefulness.

SUMMARY OF THE INVENTION

The present invention is a voice recognition interactive conversational apparatus. The apparatus utilizes a storage media which stores a plurality of temporally related data storage tracks containing interactive conversational content. The interactive conversational content is stored on each track in a plurality of information segments, each of the segments comprising a complete message reproducible in response to the selection of the track upon which the segments are stored. Each information segment is capable of comprising interrogatories having vocal responses, responsive messages, informational messages, or combinations thereof related in real-time and content to information contained in at least one information segment of at least one track. The information is stored on the tracks in a predetermined timed sequence for providing interactive pathways through the tracks dependent upon the verbal responses.

A playback device facilitates playback of the interactive conversational content of a selected data storage track. Track selector means accesses the desired one of the tracks of the storage media for retrieving the information stored thereon so as to playback the retrieved information via the playback device.

Voice recognition means receives vocal responses to the conversational content and causes the track selector means to switch between the data storage tracks based upon the vocal responses in accordance with the interactive conversational content.

In one embodiment of the invention, one of the data storage tracks includes command codes for the voice recognition means. The command codes provide switching instructions for the voice recognition means in response to receipt of vocal responses to the interactive conversation. In this embodiment, command code playback means provides playback of the track comprising the command codes independently of the tracks comprising the interactive conversational content.

In another embodiment, the temporally related data storage tracks are stored on a magnetic storage media having a plurality of coextensive tracks. The playback means may comprise either magnetic storage media reading means corresponding with each of the plurality of coextensive tracks, or magnetic storage media reading means switchable between the tracks.

If desired, the tracks may be stored digitally, such as on magnetic disk, compact disk, video disk, magnetic tape, RAM, PROM, EPROM, or EEPROM, and may be randomly accessible. The data storage media may also be analog cassette tapes, with the playback means enabling the removal and replacement of the storage media.

The conversational content preferably includes the following types of content:
   a) interrogatories, wherein the voice recognition means listens for vocal responses to the interrogatories and switches to content responsive to the vocal responses;
   b) multiple choice responsive questions enabling a user to select a question from a group of questions, wherein the voice recognition means listens for a selected question and switches to content responsive to the selected question;

c) instructions for a user to recite or pronounce a selected word, wherein the voice recognition means listens for the selected word and switches to content responsive to recognition of the selected word or content responsive to non-recognition of the selected word; and d) information demonstrating memory of at least one prior response by the user to the interactive conversation and other memory and customized functions using a decisiontree logic.

The system of the invention may categorize children on the basis of verbal responses and then engage the child in conversation with messages related to the child's category. The system can further subcategorize children, i.e., boy under 5 years old, and provide each subcategory with interactive conversation related to that subcategory. The flexibility of the system is limited only by the number of tracks available. By altering the content of the machine-child conversation in response to vocal responses of a child, the machine actually participates in a verbal conversation, and therefore provides a more realistic, enjoyable, intelligent sounding, and effective learning experience. The apparatus can also reinforce the pronunciation of correct responses by repeating the correct responses that the child made or by correctly pronouncing an incorrect answer, thereby increasing the reliability of the system.

The system of the present invention overcomes the deficiencies of prior art conversational systems which are incapable of receiving vocal responses to conversational content and of providing customized conversational content as a result of the vocal responses.

BRIEF DESCRIPTION OF THE DRAWINGS

FIG. 3 is a diagrammatic illustration, partially in schematic, of the selection, playback, and voice recognition controller portions of an alternative embodiment of the invention.

DESCRIPTION OF THE PREFERRED EMBODIMENT

Figure 1:
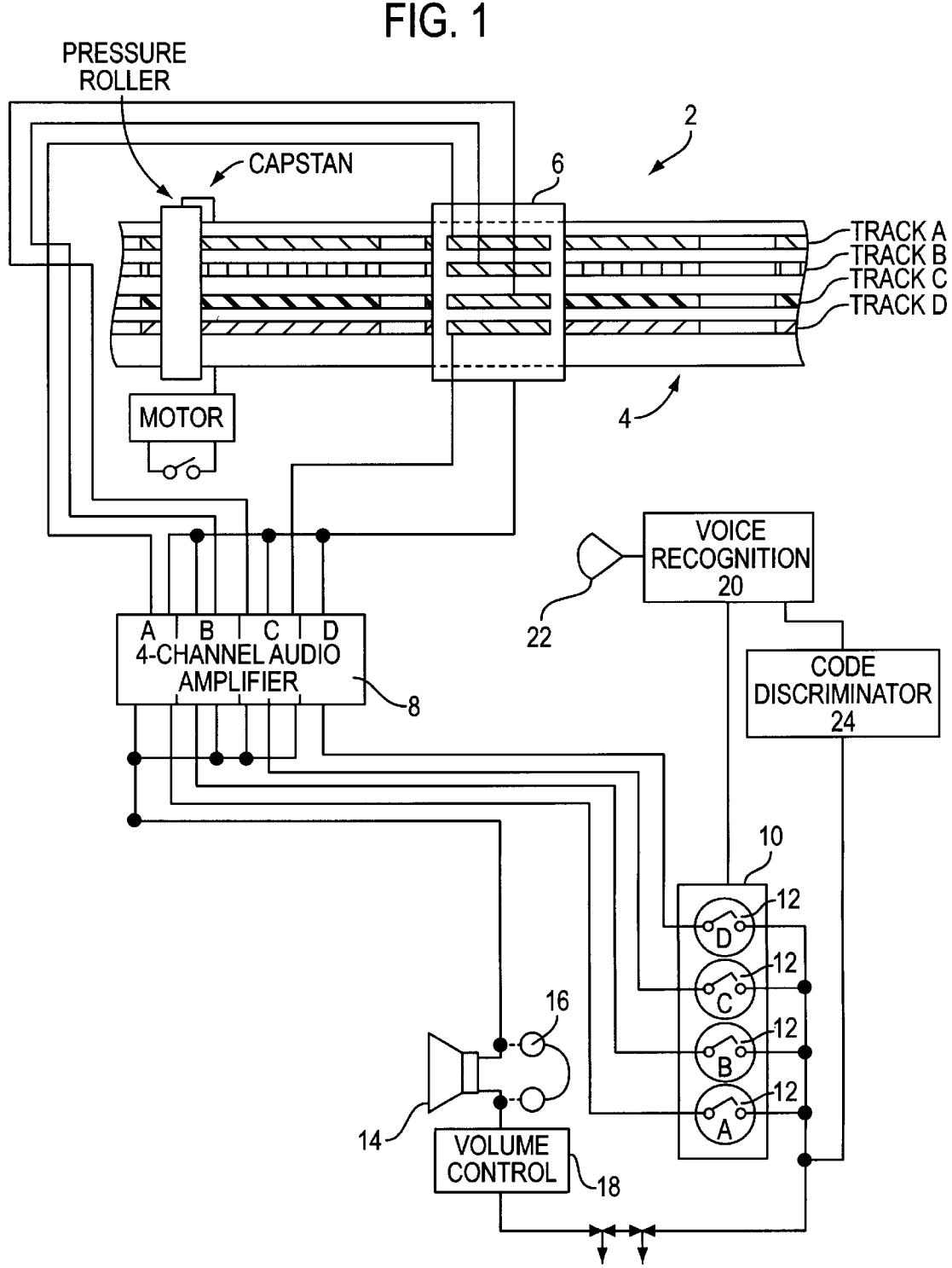
FIG. 1 is a diagrammatic illustration, partially in schematic, of the selection, playback, and voice recognition controller portions of one embodiment of the present invention.

Referring now to the drawings in detail, and initially to FIG. 1, the mechanism of the real-time interactive conversational apparatus of the present invention is generally similar to that disclosed in commonly owned U.S. Pat. Nos. 3,947,972; 5,313,510; and 5,340,317. A conventional multi-track magnetic tape player 2 is utilized for retrieving audio information from a multi-track magnetic storage media 4 via multi-track playback head 6. The playback head 6 is preferably connected in conventional fashion to a conventional four channel audio amplifier 8, having one channel for each of the respective four tracks, A, B, C, D of multi-track tape 4 so as to conventionally play back the information stored on the respective audio tracks. Playback head 6 is preferably a conventional 4 channel audio playback head, with preferably equal head widths for each of the respective tracks A, B, C, D.

The output of audio amplifier 8 is preferably connected to a switch controller 10 which preferably incorporates a plurality of switches 12, with one switch being provided per track of multi-track tape 4. Each switch 12 is connected to the appropriate channel output of audio amplifier 8. Switches 12 are preferably conventional magnetic or electronic switches that are switched as desired by switch controller 10. Switches 12 are preferably connected between the output of audio amplifier 8 and a conventional audio output device, such as a speaker 14 or earphones 16, through a volume control 18. The other terminal of audio output device 14 or 16 is connected to audio amplifier 8 to complete the circuit. Thus, when one of switches 12 is closed, the output of the corresponding audio track A, B, C or D, all of which are being provided to audio amplifier 8 by multi-track playback head 6, is selectively provided to audio output device 14 or 16 to be heard by a child or other user.

Switch controller 10 is preferably connected to an output of a voice recognition controller 20. A microphone 22 is provided in audible proximity to the user to receive voice communications from the user. The output of the microphone is communicated to voice recognition controller 20 which functions to interpret the voice communications from the user and to command switch controller 10 to switch to a desired audio track on the basis of these voice communications.

Figure 2:
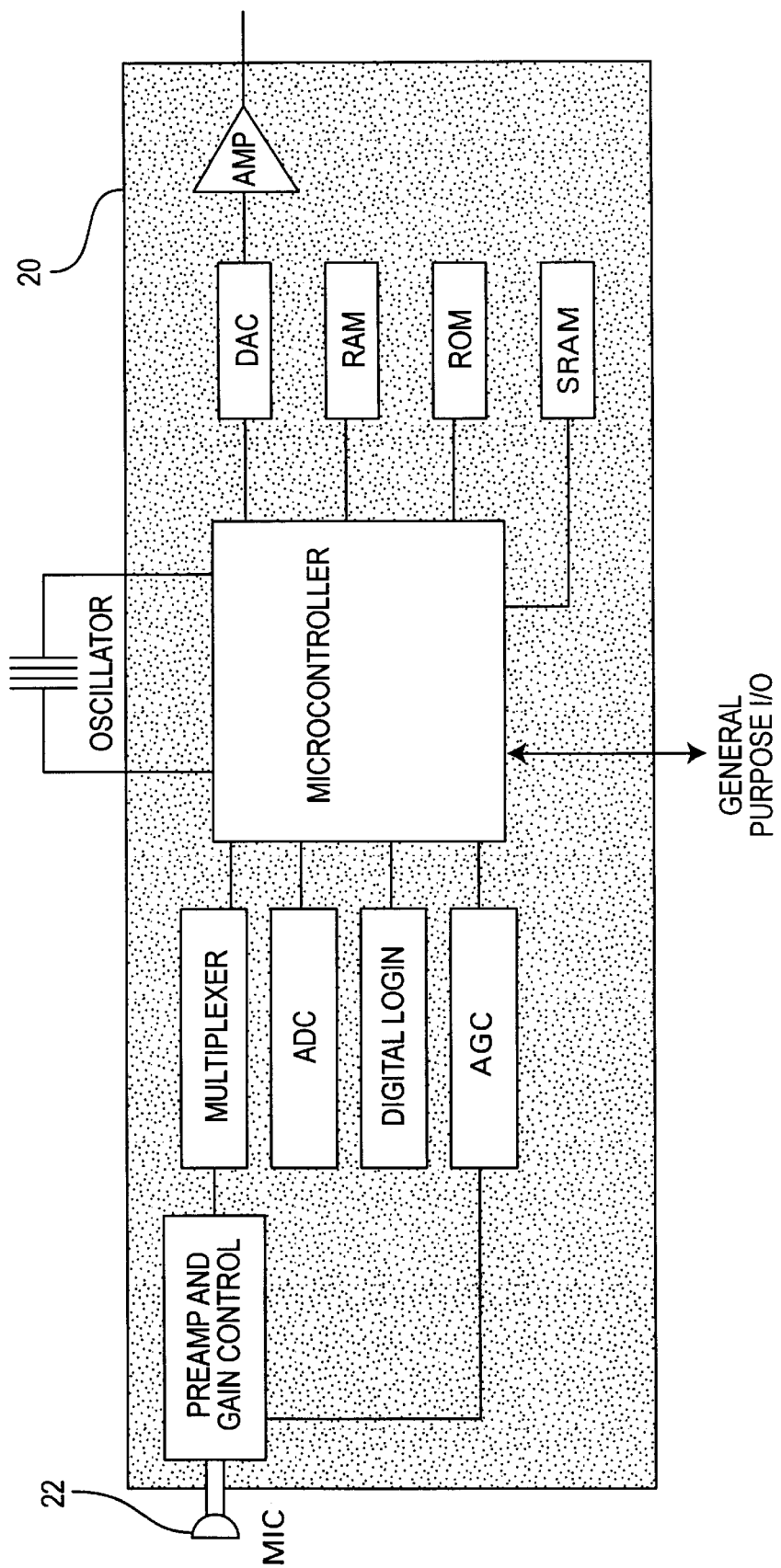
FIG. 2 is a block diagram of a voice recognition controller of the present invention.

As shown in FIG. 2, voice recognition controller 20 is preferably a conventional speech recognition unit that uses a micro-controller or microprocessor to provide high quality speaker-independent and/or speaker-dependent speech recognition. It may, for example, use a neural network that learns to classify sound data. These types of speech recognition units reach an accuracy of greater than 95% or more for speaker independent recognition and 99% or more for speaker dependent recognition. Speaker dependent speech recognition is preferably stored in SRAM while speaker independent words to be recognized are stored in a ROM. Generally speaking, voice recognition controller 20 is pre-programmed with particular words and is operated in a speaker independent mode so that it may be used by different users. In a continuous listening mode, the voice recognition controller 20 listens continuously for specific words. With this feature, voice recognition controller 20 can be used in a normal environment and only "activates" when a specific word, preceded by silence, is spoken.

Voice recognition controller 20 preferably includes general purpose I/O pins which can be programmed as an input or output. Internally, voice recognition controller 20 preferably has data and address lines along with associated control signals for interfacing to memory (EPROMs, ROMS, SRAMs). It will be appreciated that any appropriate speech recognition system may be used for voice recognition controller 20 and that not all such speech recognition systems will necessarily be capable of performing the functions necessary for each of the embodiments described below.

Switch controller 10 is preferably a relatively simple logic circuit for receiving the output of voice recognition controller 20 and for switching to one of the audio tracks on the basis of this output. For example, voice recognition controller 20 may utilize a two-bit output which is received by switch controller 10 and by which switch controller 10 selects from amongst the 4 channels.

As described in greater detail below, the audio tracks include messages that require voice responses, such as true/false or multiple choice questions. These responses are received by microphone 22 and are communicated to voice recognition controller 20. Voice recognition controller 20 interprets the voice responses and generates commands to switch controller 10 to select from amongst the four channels on the basis of the response. If desired, the present invention may be simultaneously utilized by a plurality of children if configured with multiple voice recognition controllers 20 and switch controllers 10, as generally described in commonly owned U.S. Pat. No. 3,947,972.

The multi-track tape 4 is preferably removable from the playback means 2 so that different multi-track tapes 4 having different interactive conversations stored thereon may be inserted and used in the apparatus of the invention. This makes it possible to record a library of prerecorded media covering a wide array of topics. For example, as described below, the media might contain mathematics problems at different levels, multiple choice trivia questions, learning exercises, or even interactive story telling. The removable media are preferably multi-track magnetic tape cartridges, but may be any removable multi-track media such as, for example, magnetic disk, optical disk, or other media appropriate for the present application. These removable multi-track tapes are preferably contained in rigid cartridges for convenient removal and replacement.

The apparatus of the present invention may comprise other embodiments. Rather than utilizing a multi-track magnetic tape or other removable media, the system might use any appropriate data storage means for containing the various conversational messages employed by the system, provided that the information stored thereon may be separated into tracks. For example, a conventional magnetic disk, CD or other optical disk, or even hardware, such as RAM, PROM, ROM or EPROM, could be used to store the information. The information data could be physically stored on individual disk tracks, or the data could be organized so that each track of information is randomly accessible as separate or separable files on the disk or storage media. In conjunction with a disk reader appropriate for the type of disk drive in use, or a microprocessor or microcontroller for reading the digital data from a hardware memory device, the information stored on the individual conversational tracks could be output to a user of the system in near real-time fashion.

When utilizing a disk or other physical media for storing digital data, it might be advantageous for a microprocessor to be provided for the purpose of first reading the various tracks into a memory cache, which would allow faster access to the conversational information. Thus, during operation in this instance, the microprocessor would read the serial track information from the disk into parallel tracks in cache memory in advance, while substantially simultaneously reading the track data from cache to memory to an output device. As the cache memory were depleted, it would be refilled from disk or other media by the processor. The microprocessor could be used in this instance also to provide the voice recognition and switching functions.

Output to the user could be by various devices, depending on the type of media used. For example, if the stored conversations on the multi-track media are in digital form, i.e. CD-ROM, magnetic disk, DAT, the processor or other means could convert the digital information streams to analog signals for output to conventional headphones or could be output directly to digital headphones. Alternatively, the conversation stream could contain video as well as audio signals. An audio/video processor would generate the appropriate video and audio signals. It is anticipated that the interactive system of the present invention could employ a large variety of multi-media inputs and outputs as such technologies develop. It is further anticipated that any storage means capable of storing and substantially simultaneously retrieving conversational data could be employed by the present invention. Whatever multi-track device is employed, it should preferably contain one track for each of the number of tracks to be used in the interactive conversation. In a preferred embodiment, four equal bandwidth tracks are used. It may, however, be advantageous to utilize a larger number of tracks to obtain more complex conversations and to exhibit more sophisticated memory type functions.

If the system were to be usable by only one person at a time, the four channel audio amplifier could be replaced by a conventional one channel amplifier which amplifies only the one selected channel. As discussed below, if one channel is to be reserved for control commands, a conventional one channel amplifier could be used for to read the control commands, while another conventional one channel amplifier could be used to select from amongst the remaining channels for the interactive verbal conversation.

The information is stored on each track in a plurality of reproducible information segments, each of which comprises a complete message reproducible by the playback device directly in response to the selection of the track upon which the segments are stored. Each of the information segments on the various tracks contain interrogatory messages with associated vocal responses, responsive messages, informational messages, or combinations thereof. The messages contained on the various tracks are related in real-time to particular interrogatory messages, and correspond to the vocal responses to the particular interrogatory messages so that an interactive conversation can occur as the media is played back and the user verbally responds to the messages on the tracks. As the user answers a particular interrogatory with a verbal response, the information on the track associated with the particular verbal response is routed to the output device. On the selected track at the time at which the selection occurred, is an information segment whose content corresponds with the verbal response to the previous interrogatory, whether or not the interrogatory was on the same track as the information segment being output. The various interrogatories, responsive messages, and informational messages may generally be contained on any or all of the various tracks provided that they are synchronized properly so as to retain a timed relationship. Numerous examples of the types of conversations that are possible using this technique, including the use of decision tree logic to provide pseudo-memory and other customized functions, are described in the aforementioned U.S. Pat. Nos. 3,947,972; 5,313,510; and 5,340,317.

In order to understand the verbal interactive conversational system of the invention, several examples will now be provided. Example 1 illustrates a relatively simple interactive conversation. In this example, voice recognition controller 20 is programmed to generate the following binary outputs upon recognizing the respective words shown:

| Recognized Word | Binary Output |
| --- | --- |
| Chicken | 00 |
| Horse | 01 |
| Giraffe | 10 |
| False | 00 |
| True | 01 |
| Elephant | 00 |
| Whale | 01 |
| Bear | 10 |
| No answer | 11 |
| Indeterminable answer | 11 |

Switch controller 10 receives the binary signal from voice recognition controller 20 and selects a channel from channels 1, 2, 3 and 4 corresponding to binary outputs 00–11. Thus, if the word "whale" were recognized by voice recognition controller 20, the contents of channel 2 would be routed to the output device.

EXAMPLE 1

| CHANNEL 1 | CHANNEL 2 | CHANNEL 3 | CHANNEL 4 |
|---|---|---|---|
| I will now ask you 3 questions about animals. Make sure to answer as clearly as possible so that I understand you. Here we go. What animal can make no sound at all? Is it a chicken, a horse, or a giraffe. Answer now! | Same as channel 1 | Same as channel 1 | Same as channel 1 |
| ANSWER TIME | ANSWER TIME | ANSWER TIME | ANSWER TIME |
| No, a chicken does make a sound, and it sounds like this: (SFX). The answer was giraffe. Question #2 is a true/false question: True or false-a penguin has wings but can not fly. Answer now. | No, a horse does make a sound, and it sounds like this: (SFX). The answer was giraffe. Question #2 is a true/false question: True or false-a penguin has wings but can not fly. Answer now, if you would. | Yes, you answered correctly. Let me compliment you on your speech. A giraffe makes no sound. Good work. Question #2 is a true and false questIon: True or false -a penguin has wings but can not fly. Answer now. | I'm sorry, I did not understand your answer. You must speak slowly and clearly for me to understand you. The answer was giraffe. Here is Question #2: True or false-A penguin has wings but can not fly. Answer Now. |
| ANSWER TIME | ANSWER TIME | ANSWER TIME | ANSWER TIME |
| You are speaking very clearly, but unfortunately you did not get the correct answer. Believe it or not, the statement I made earlier is true, penguins can't fly. Here is your third and final question: What is the largest mammal? An elephant, a whale, or a bear. Answer now! | You are speaking very clearly and your brain is functioning well. It is true. Penguins can't fly. You are obviously a child who knows a lot about our feathered friends. Same as Channel 1. | No Content | I'm sorry, I did not understand your answer. You must speak slowly and clearly for me to understand you. Believe it or not, the statement I made is true, penguins can't fly. Same as Channel 1. |

EXAMPLE 1-continued

| ANSWER TIME | ANSWER TIME | ANSWER TIME | ANSWER TIME |
|---|---|---|---|
| I'm sorry, but the answer was a whale, not an elephant. That last question was tricky, because many people think whales are fish, because they live in the water. But whales are mammals. Since you're such a good child, here is a joke: What happened to the duck who flew upside down? He quacked up! (Laughter) then he ate some cheese and quackers. (Laughter). (END) | You are correct, the answer is a whale. That is a very good answer, as most people forget that whales are mammals not fish. Since you're such a smart child and know so much about fish, I am going to tell you a joke: What happened to the duck. who flew upside down? He quacked up! (Laughter). then he ate some cheese and quackers. (Laughter). (END) | I'm sorry, but the answer was a whale, not a bear. That last question was tricky, because many people think whales are fish, because they live in the water. But whales are mammals. Since you're such a good child, here is a joke: What happened to the duck who flew upside down? He quacked up! (Laughter) then he ate some cheese and quackers. (Laughter). (END) | I'm sorry, you must speak slowly and clearly for me to understand you. The answer was a whale. That last question was tricky, because many people think whales are fish, because they live in the water. But whales are mammals. Here is a joke: What happened to the duck who flew upside down? He quacked up! (Laughter) then he ate some cheese and quackers. (Laughter). (END) |

As described in the aforementioned U.S. Pat. Nos. 5,313,510 and 5,340,317, the voice recognition system could be configured using decision tree logic so as to provide pseudomemory, so as to, for example, control the sequence of questions in such a way as to address the child who answers, for example, a number of questions correctly.

Example 2 demonstrates use of the system for teaching children how to speak various words. The system categorizes children based upon a response to a particular interrogatory, then provides each category with independent tailored interactive conversation. In this example, the children are categorized by age, with children under 5 participating in an interactive conversation tailored for their age group, and children over 5 participating in a completely separate conversation. For this program, it is assumed that switch controller 10 automatically detects when the "PLAY" button is pressed (or whatever key is used to initiate a program), and defaults to channel 1. For this program, voice recognition controller 20 is programmed with the following words, and generates the binary outputs shown upon recognizing such words:

| Recognized Word | Binary Output |
|---|---|
| Baby | 00 |
| Child | 10 |
| Start | 11 |
| Seven | 00 |
| Ten | 01 |
| Fifteen | 10 |
| Hello | 01 |
| Forty | 01 |
| Fifty | 10 |
| Sixty | 11 |

| Recognized Word | Binary Output |
| --- | --- |
| Cow | 00 |
| Horse | 01 |
| Moon | 10 |
| Sun | 11 |

Switch controller 10 receives the binary signal from voice recognition controller 20 and selects the desired channel. It will be appreciated that switch controller 10 can vary in complexity from a simple logic device to a microprocessor provided that it performs the functions described herein.

EXAMPLE 2

| CHANNEL 1 | CHANNEL 2 | CHANNEL 3 | CHANNEL 4 |
| --- | --- | --- | --- |
| Hello boys and girls. I want to ask you a few questions. But be sure to answer the questions only when I tell you to. If you are under 5 years old, say "baby." If you are 5 years old or older, say "child". Answer now! | No content | No content | No content |
| ANSWER TIME | ANSWER TIME | ANSWER TIME | ANSWER TIME |
| Thank you. I now know you are under 5 years old. Here is a special program for children your age. How many fingers do you have? Seven, ten, or fifteen? Answer now. | You gave an incorrect answer. I guess you're under 5. Here is a special program for children of your age. How many fingers do you have? Seven, ten, or fifteen? Answer now. | Thank you. I'm pleased to know you're 5 or older. You must be in school by now! I have a special program for school-age children, and we can begin it if you say "start" now. | You gave an incorrect answer. I'll assume you meant to tell me that you are 5 or older. I have a special program for school-age children, and we can begin it if you say "start" now. |
| ANSWER TIME | ANSWER TIME | ANSWER TIME | ANSWER TIME |
| Seven? Uh oh, I think you miscounted. The answer is 10. Please say "hello" now! | That's right, 10 fingers! You found each and every one! Please say "hello" now! | Uh oh, 15? You're wrong. The answer is 10. Let's continue. I want you to say "hello" now. | OK. How many states are in the United States? Forty, Fifty, or Sixty? Answer now! |
| ANSWER TIME | ANSWER TIME | ANSWER TIME | ANSWER TIME |
| Here is your next question, and it's special because I know you're 5 years old. Who is Mickey Mouse's girlfriend? Minnie, Lucy, or Mabel? Answer now! | Oh no. You think there are only 40 states! Actually, there are 50. | Oh no. You think there are 60 states? Actually, there are 50. I thought you would know that since you are 5 years old or older. Let's continue. Say "hello" now. | Terrific! You know that there are 50 states in the United States! I'm so glad you would know that, since you are 5 years old or older. Let's continue. Say "hello" now. |
| | I thought you would know that since you are 5 years old or older. Let's continue. Say "hello" now. | you would know that, since you are 5 years old or older. Let's continue. Say "hello" now. | for sure you would know that, since you are 5 years old or older. Great job. Let's continue. Say "hello" now. |
| ANSWER TIME | ANSWER TIME | ANSWER TIME | ANSWER TIME |
| I just love asking you questions! Here's another: what makes rainbow? Say "moon" if you think the sky and the moon make it, or say "sun" if you think the sun and rain make rainbows. Answer now. | Minnie is absolutely right! Here's another question: Where does milk come from? Do you think it comes from a cow or do you think it comes from a horse. You can answer now. | Lucy is wrong-- it's Minnie! Here's another question: Where does milk come from? Do you think it comes from a cow or do you think it comes from a horse. You can answer now. | Mabel is wrong-- it's Minnie! Here's another question: Where does milk come from? Do you think it comes from a cow or do you think it comes from a horse. You can answer now. |
| ANSWER TIME | ANSWER TIME | ANSWER TIME | ANSWER TIME |
| You know that milk comes from cows. You are very smart for someone who is younger than 5 years old. . . | Hee hee. Milk comes from horses No silly, the milk we drink comes from cows. I'll forgive you, since you are not even 5 yet. . . | No, not the sky and the moon. Since you're 5 or older, you should know that rainbows are made by the sun and rain. . . | I'm so happy you know that the sun and rain make rainbows-- but since you're 5 or older, it was a very easy question for you to answer. . . |
| (End) | (End) | (End) | (End) |

The "ANSWER TIME" on the audio tracks is preferably either a silent period in which the voice recognition controller can recognize the vocal responses against a quiet background, or a time period in which voice recognition controller 20 is placed in a listening mode by, for example, audible or inaudible tones that are on the audio track and that are received by an optional tone discriminator 24. For example, at the start of the "ANSWER TIME," an audible or inaudible tone may be provided on the audio track. The tone is recognized by tone discriminator 24, which turns voice recognition controller into a listening mode. A tone at the end of the "ANSWER TIME" that is received by code discriminator 24, or a predetermined time delay, terminates the listening mode. In the listening mode, the voice recognition controller is capable of actively switching between tracks in response to recognition of the words programmed into its database. When the listening mode is terminated, voice recognition controller is disabled from causing switching between tracks.

If desired, the playback of the storage media may be stopped during the listening mode to enable the user sufficient time to pronounce the response correctly. Playback may then begin again once a correct response has been received or when a predetermined period of time has elapsed.

By properly timing and synchronizing the tracks, the program for each of the categories is alternated between the channels so that the program for children under 5 shares channel space with the program written for children 5 and over. Each program remains completely independent.

As shown in Example 3, the system of the invention may be used to teach children to pronounce words that are stored in voice recognition controller 20. For this program, it is assumed that switch controller 10 automatically detects when the "PLAY" button is pressed (or whatever key is used to initiate a program), and defaults to channel 1. Also for this program, voice recognition controller 20 is programmed with the following words, and generates the binary outputs shown upon recognizing such words:

| Recognized Word | Binary Output |
| --- | --- |
| Hello | 01 |
| Intelligent | 10 |
| Apple | 11 |
| Properly | 00 |
| Not recognized | No track change |

In this embodiment, a short time delay, i.e., ½ second, is placed in the audio tracks prior to selected audio words that are to be recognized by voice recognition controller 20. In this way, the audio itself can be used to provide switch commands to voice recognition controller 20 without the need for embedding command codes. Optionally, audible or inaudible tones in the audio may be used to place voice recognition controller 20 in a listening mode prior to the switch-causing words in the audio.

| CHANNEL 1 | CHANNEL 2 | CHANNEL 3 | CHANNEL 4 |
| --- | --- | --- | --- |
| Please try to say the word "Hello" now. You are not pronouncing it correctly. Sometimes it is difficult to learn to say new words. Try saying it as "hel"-"ow". Try it again now. | That is correct. You are very, very [short time delay] intelligent. | Now try saying the word "apple." Answer now. | |
| ANSWER TIME | ANSWER TIME | ANSWER TIME | ANSWER TIME |
| You are still not pronouncing it correctly. It is pronounced "hello". Now try saying the word "airplane". Answer now. | That is correct. You are a very smart child. You pronounced the word [short time delay] properly. | You are not pronouncing it correctly. Sometimes it is difficult to learn to say new words. You should try to speak slowly and carefully. Try saying it as "ah"-"pull". Try it again now. | That is correct. I always enjoy working with children that know how to pronounce words [short time delay] properly. |

| ANSWER TIME | ANSWER TIME | ANSWER TIME | ANSWER TIME |
| --- | --- | --- | --- |
| You are not pronouncing it correctly. Sometimes it is difficult to learn to say new words. Try saying it as "air"-"plane". Try it again now. | That is correct. You are very, very [short time delay] intelligent. | You are not pronouncing it correctly. Next time try to speak more slowly. Let's try saying the word "please". Try saying it now. | That is correct. You are very, very [short time delay] intelligent |
| ANSWER TIME | ANSWER TIME | ANSWER TIME | ANSWER TIME |
| . . . | . . . | . . . | . . . |

Additionally, if video output is to be used in an embodiment of the present invention, the video display might correspond with the questions asked in the course of the conversation. If it were desired to use a touch screen, the screen display might include labels for the multiple choice selections that could be used to provide switching in combination with the voice recognition switching disclosed herein. For example, in addition to voice response questions, the system may also use touch response questions to provide switching. In this embodiment, switch controller 10 would require manually activated switching capabilities as well.

In an alternative embodiment of the invention, as shown in FIG. 3, a microprocessor 26 is utilized to read track switching instructions from the audio tape itself in order to perform switching in response to the output of the voice recognition controller. It will be appreciated that in this embodiment of the invention, the voice recognition controller may be integrated within microprocessor 26 or the microprocessor may simply receive the output of the voice recognition controller.

In Example 4 below, the system is used to teach how to speak so that the apparatus can understand the child's speech.

EXAMPLE 4

| CHANNEL 1 | CHANNEL 2 | CHANNEL 3 | CHANNEL 4 (Instrumentation only. No Verbiage.) |
| --- | --- | --- | --- |
| I am a machine that can speak intelligently to you and I can understand you as you speak to me! For example, which is the first month of the year? Speak your answer now. . . | Same as Channel 1 | Same as Channel 1 | |
| | | | Recognize speech and branch to proper channel |
| I did not understand that. Say "January". Say it just like | Very good. I did understand you. You said January and | As far as I can tell you said nothing. You must | |

EXAMPLE 4-continued

| | | | |
|---|---|---|---|
| this--J-a-n-u-a-r-y. Now try it again, say January now... | you said it clearly enough for me to understand it. Nice going. | speak to me if I am going to understand you. Say January now. . . | |
| Still no good. I cannot understand. Let's go on to another word. Say the word "TRUE" now. . . | Please continue to speak clearly. Let's try another word. Say the word "TRUE". Go ahead say TRUE now. . . | Great improvement. I understood you that time. You said "January". Now say said word TRUE. Say it now. . | Recognize speech and branch to proper channel. |
| Great I understand that. | Sorry. I could not understand you. | | Same as above. |
| End | End | End | End |

In Example 5, the system is used to teach and entertain a child with 2-way speech communication.

EXAMPLE 5

| CHANNEL 1 | CHANNEL 2 | CHANNEL 3 | CHANNEL 4 (Instrumentation information only. No Verbiage.) |
|---|---|---|---|
| Hello, I am your favorite toy character. With this new device I can talk to you and you can talk back to me. I will be able to understand you and respond to you accordingly. Let's try it. Are you a girl or a boy. Say girl or boy now. | Same as Channel 1 | Same as Channel 1 | Recognize Speech and branch to proper channel. Put channel associated with "boy" or "girl" response in memory "X". |
| I did not understand you. Please try to talk more clearly. | Thanks, I heard you. You are a girl. Nice to meet you little girl! | Thanks, I heard you. You are a boy. Nice to meet you little boy! | |
| Here is a special question for you. Same as Ch. 3 | Here is a special question for girls. In what sport did Nancy Kerrigan win a silver medal? A. Ice skating. B. Tennis, or C. Gymnastics. Say A, B, or C now. | Here is a special question for boys. What sport does Michael Jordan play best? here are three choices. A. Basketball, B. Tennis, or C. Hockey. Say A, B, or C now. | Recognize speech and branch to proper channel. |
| You are right. You said "A" and "A" is the right answer. | Sorry you are wrong. You said "B" but "A" was the right answer. Too bad. | Sorry you are wrong. You said "C" but "A" was the right answer. Too bad. | |
| Basketball is what Michael Jordan plays best; | Ice skating is the sport in which Nancy Kerrigan won a silver medal. | O.K. Well I hope you are having fun. I know I am. | Switch to channel in memory "X". |
| O.K. little boy. Here is another question for you. Of all the animals on Earth, which is the tallest. Say rhinoceros, giraffe, or elephant now. Rhinoceros is wrong. The giraffe is the tallest animal on Earth. | O.K. little girl. Here is another question for you. Same as Ch. 1. Giraffe is correct. You are smart. Giraffe is taller than any other animal in the world. | O.K. my fried. Here is another question for you. Same as Ch. 1. Elephant is a good guess but wrong. The giraffe is the tallest animal on Earth. Almost 20 feet tall! | Recognize speech and switch to proper channel. |
| I better now give you an easier question. | I will now give you a harder questions. | Same as Ch. 1. | |
| Etc. Well little girl, its now time to say goodbye. End | Etc. Well little boy, its now time to say goodbye. End | Etc. Well my little friend its now time to say goodbye. End | Switch to Ch. in memory "X". End |

It will be appreciated that the present invention provides a method by which a child can engage in an interactive conversation with a machine in which the machine, which may have, for example, the voice of a well-known character, possesses interactive capabilities never before possible. The invention allows the character to verbally converse, entertain, and educate children like never before possible. The child talks to the character and the character understands the child's speech and responds with appropriate speech, thereby enabling two-way conversation to occur. In various separate programs, or in a single program, the system can be used to, for example:

1) Ask a child a question, listen for the child's answer, and immediately tell the child if their answer is right or wrong.
2) Allow a child to ask the character a question from a group of questions that the character provides to the child and respond to the specific questions answered. Using memory functions, which need not use a microprocessor, the character can even tailor its answers to the child based upon prior responses.
3) Teach the child to talk louder or clearer if the character, i.e., the voice recognition controller 20, cannot understand the child.
4) Remember a child's answers from previous questions.
5) Refer to the child by gender.
6) Alter the programming by age level or other categorization to meet the special requests and needs of these children.
7) Allow children to make-up, change, and determine the endings of stories.
8) Play unique games with/or against children.
9) Allow children to create, edit, and playback musical compositions based on their verbal instructions.

In addition to the above capabilities, The system can simply converse with children; asking them how they feel, how they enjoy school, whether they have brothers and sisters and then react and respond the way a playmate would. In this way, the system can become a child's "conversational pal" and can engage the child in hours of back-and-forth education and conversational interplay.

Although the present invention has been described in detail with respect to certain embodiments and examples, variations and modifications exist that are within the scope of the present invention as defined in the following claims.

What is claimed is:

1. A voice recognition interactive conversational apparatus which comprises:

a storage media which comprises a plurality of temporally related data storage tracks containing interactive conversational content and voice recognition command codes, the interactive conversational content being stored on each track in a plurality of information segments, each of the segments comprising a complete message reproducible in response to the selection of the track upon which the segments are stored, each of the information segments being capable of comprising interrogatories having vocal responses, responsive messages, informational messages, or combinations thereof related in real-time and content to information contained in at least one information segment of at least one track, the information stored on the tracks in a predetermined timed sequence for providing interactive pathways through the tracks dependent upon the verbal responses, the voice recognition command codes providing switching instructions through the interactive pathways of the conversational content in response to receipt of vocal responses in order to provide interactive conversational content that varies based upon the vocal responses;

playback means for facilitating playback of the interactive conversational content of a selected data storage track and for facilitating playback of the command codes from the storage media;

track selector means for enabling random access to any one of the tracks of the storage media for retrieving the information stored thereon for enabling the playback of the retrieved information via the playback means;

a voice recognition code discriminator for identifying the voice recognition command codes played back from the storage media by the playback means;

voice recognition means for receiving and identifying user vocal responses to the conversational content, the voice recognition means generating a signal representative of the identified vocal response; and a controller for receiving the voice recognition command codes from the code discriminator and for receiving the vocal responses to the conversational content from the voice recognition means, the controller causing the track selector means to switch between the data storage tracks based upon the voice recognition command code corresponding to each received vocal response.

2. The apparatus according to claim 1 wherein one of the data storage tracks comprises the voice recognition command codes; and the playback means further comprises command code playback means for providing playback of the track comprising the voice recognition command codes independently of the tracks comprising the interactive conversational content.

3. The apparatus according to claim 2 wherein the temporally related data storage tracks are stored on a magnetic storage media having a plurality of coextensive tracks wherein the playback means comprises magnetic storage media reading means for the command code track, and at least one magnetic media storage media reading means for the coextensive tracks comprising the interactive conversational content.

4. The apparatus according to claim 1 wherein the tracks comprising conversation content comprise audible or inaudible voice recognition command codes.

5. The apparatus according to claim 4 further comprising means for discriminating the audible or inaudible voice recognition command codes from the conversational content.

6. The apparatus according to claim 1 wherein the tracks are stored digitally and are randomly accessible.

7. The apparatus according to claim 6 wherein the storage media is selected from the group consisting of magnetic disk, compact disk, video disk, magnetic tape, RAM, PROM, EPROM, and EEPROM.

8. The apparatus according to claim 1 wherein the temporally related data storage tracks are stored on a magnetic storage media having a plurality of coextensive tracks wherein the playback means comprises magnetic storage media reading means corresponding with each of the plurality of coextensive tracks.

9. The apparatus according to claim 1 wherein the data storage media are analog cassette tapes and wherein the playback means enables the removal and replacement of the storage media.

10. The apparatus according to claim 1 wherein the conversational content comprises content selected from the group consisting of:

a) interrogatories, wherein the voice recognition means listens for vocal responses to the interrogatories and the controller switches between interactive pathways of the conversational content responsive to the vocal responses;

b) multiple choice responsive questions enabling a user to select a question from a group of questions, wherein the voice recognition means listens for a selected question and the controller switches to content in the interactive pathways responsive to the selected question;

c) instructions for a user to recite or pronounce a selected word, wherein the voice recognition means listens for the selected word and the controller switches to content in the interactive pathways responsive to recognition of the selected word or content in the interactive pathways responsive to non-recognition of the selected word; and (d) information demonstrating memory of at least one prior response by the user to the interactive conversation.

11. In an improved real-time interactive conversational apparatus having a storage media having interactive conversational content stored thereon for playback therefrom, the conversational content comprising a plurality of temporally related data storage tracks, the interactive conversational content being stored on each track in a plurality of information segments, each of the segments comprising a complete message reproducible in response to the selection of the track upon which the segments are stored, each of the information segments being capable of comprising interrogatories having responses, responsive messages, informational messages, or combinations thereof related in real-time and content to information contained in at least one information segment of at least one track, the information stored on the tracks in a predetermined timed sequence for providing interactive pathways through the tracks dependent upon the responses;

playback means for randomly obtaining the stored audio information from each of the tracks;

selection means operatively connected to the playback means for directly selecting one of the tracks for selectively playing the information stored thereon; and audio output means operatively connected to the playback means and the selection means for reproducing the selected track information as an output therefrom;

wherein the improvement comprises:

each of the information segments being capable of comprising interrogatories having vocal responses, responsive messages, informational messages, or combinations thereof related in real-time and content to information contained in at least one information segment of the least one track, the information stored on the tracks in a predetermined timed sequence for providing interactive pathways through the tracks comprising an interactive conversation dependent on the vocal response, the conversational content further comprising voice recognition command codes providing switching instructions through the interactive pathways of the conversational content in response to receipt of the vocal responses in order to provide interactive conversational content that varies based upon the vocal responses;

the playback means further comprising means for facilitating playback of the command codes from the storage media;

a voice recognition code discriminator for identifying the voice recognition command codes played back from the storage media by the playback means;

voice recognition means for receiving and identifying user vocal responses to the conversational content, the voice recognition means generating a signal representative of the identified vocal response; and a controller for receiving the voice recognition command codes from the code discriminator and for receiving the vocal responses to the conversational content from the voice recognition means, the controller causing the track selector means to switch between the data storage tracks based upon the voice recognition command code corresponding to each received vocal response.

12. A method of providing interactive conversation with voice recognition comprising the steps of:

storing interactive conversational content and voice recognition command codes on a storage media which comprises a plurality of temporally related data storage tracks, the interactive conversational content being stored on each track in a plurality of information segments, each of the segments comprising a complete message reproducible in response to the selection of the track upon which the segments are stored, each of the information segments being capable of comprising interrogatories messages, or combinations thereof related in real-time and content to information contained in at least one information segment of at least one track, the information stored on the tracks in a predetermined timed sequence for providing interactive pathways through the tracks dependent upon the verbal responses, the voice recognition command codes providing switching instructions through the interactive pathways of the conversational content in response to receipt of vocal responses in order to provide interactive conversational content that varies based upon the vocal responses;

during playback of the conversational content and the voice recognition command codes, identifying the voice recognition command codes;

receiving and identifying user vocal responses to the conversational content; and using the voice recognition command codes and the vocal responses to the conversational content, switching between the data storage tracks based upon the voice recognition command code corresponding to each received vocal response.

13. The method according to claim 12 further comprising the steps of storing the voice recognition command codes on one of the data storage tracks for providing switching instructions in response to recognized vocal responses; and playing back the track comprising the voice recognition command codes independently of the tracks comprising the interactive conversational content.

14. The method according to claim 12 wherein the temporally related data storage tracks are stored on a magnetic storage media having a plurality of coextensive tracks and wherein playback is provided by magnetic storage media reading means corresponding with each of the plurality of coextensive tracks.

15. The method according to claim 12 wherein the tracks are stored digitally and are randomly accessible.

16. The method according to claim 15 wherein the storage media is selected from the group consisting of magnetic disk, compact disk, video disk, magnetic tape, RAM, PROM, EPROM, and EEPROM.

17. The method according to claim 12 wherein the data storage media are analog cassette tapes and wherein the storage media is removable.

18. The method according to claim 12 wherein the conversational content comprises content selected from the group consisting of:

a) interrogatories, the method further comprising the step of recognizing vocal responses to the interrogatories and switching to content responsive to the vocal responses;

b) multiple choice responsive questions enabling a user to select a question from a group of questions, the method further comprising the step of recognizing a selected question and switching to content responsive to the selected question;

c) instructions for a user to recite or pronounce a selected word, the method further comprising the step switching to content responsive to recognition of the selected word or content responsive to non-recognition of the selected word; and d) information demonstrating memory of at least one prior response by the user to the interactive conversation.

19. The method according to claim 13 wherein the temporally related data storage tracks are stored on a magnetic storage media having a plurality of coextensive tracks, and wherein playback is provided by magnetic storage media reading means for the command code track and at least one magnetic media storage media reading means for the coextensive tracks comprising the interactive conversational content.

* * * * *